US009314858B2

(12) United States Patent
Rowe

(10) Patent No.: US 9,314,858 B2
(45) Date of Patent: Apr. 19, 2016

(54) TABLE MITER SAW

(76) Inventor: James T. Rowe, Savannah, GA (US)

( * ) Notice: Subject to any disclaimer, the term of this patent is extended or adjusted under 35 U.S.C. 154(b) by 1173 days.

(21) Appl. No.: 13/208,788

(22) Filed: Aug. 12, 2011

(65) Prior Publication Data

US 2012/0204688 A1 Aug. 16, 2012

Related U.S. Application Data

(60) Provisional application No. 61/372,937, filed on Aug. 12, 2010.

(51) Int. Cl.
| | |
|---|---|
| *B23D 33/02* | (2006.01) |
| *B23D 45/06* | (2006.01) |
| *B23D 59/00* | (2006.01) |
| *B27B 27/08* | (2006.01) |
| *B27B 27/10* | (2006.01) |

(52) U.S. Cl.
CPC ............ *B23D 45/062* (2013.01); *B23D 59/003* (2013.01); *B27B 27/08* (2013.01); *B27B 27/10* (2013.01); *Y10T 83/04* (2015.04); *Y10T 83/7697* (2015.04)

(58) Field of Classification Search
CPC .... B23D 45/062; B23D 59/003; B27B 27/08; B27B 27/10; Y10T 83/04; Y10T 83/7697
USPC ............. 83/443, 468.3, 468.2, 485, 483, 471, 83/471.3, 477.2
See application file for complete search history.

(56) References Cited

U.S. PATENT DOCUMENTS

| | | | | |
|---|---|---|---|---|
| 3,013,592 | A | * | 12/1961 | Ambrosio et al. ............... 83/473 |
| 3,315,554 | A | * | 4/1967 | Jaegers ............................ 83/488 |
| 3,344,819 | A | * | 10/1967 | Mitchell ....................... 83/471.3 |
| 3,901,498 | A | | 8/1975 | Novak |
| 4,249,442 | A | | 2/1981 | Fittery |
| 4,336,733 | A | * | 6/1982 | Macksoud .................... 83/477.2 |
| 4,516,612 | A | * | 5/1985 | Wiley ............................. 144/1.1 |
| 4,548,107 | A | * | 10/1985 | Marchese et al. ................. 83/23 |
| 4,549,455 | A | * | 10/1985 | Perilloux, Jr. ................ 83/477.2 |
| 5,040,444 | A | * | 8/1991 | Shiotani et al. .................. 83/473 |
| 5,720,213 | A | | 2/1998 | Sberveglieri |
| 5,819,625 | A | | 10/1998 | Sberveglieri |
| 5,943,932 | A | | 8/1999 | Sberveglieri |
| 6,182,548 | B1 | | 2/2001 | Meredith et al. |
| 6,591,725 | B1 | | 7/2003 | Martin |
| 6,684,750 | B2 | | 2/2004 | Yu |
| 6,994,008 | B2 | * | 2/2006 | Liao et al. ........................ 83/473 |
| 7,320,270 | B2 | | 1/2008 | Liu |
| 7,673,548 | B2 | * | 3/2010 | Kelly .............................. 83/581 |
| 7,726,224 | B1 | * | 6/2010 | Panko ........................... 83/468.3 |
| 8,166,860 | B2 | * | 5/2012 | Gibbons et al. .................. 83/473 |
| 8,286,538 | B2 | * | 10/2012 | Roberts et al. ................. 83/76.1 |
| 8,726,773 | B2 | * | 5/2014 | Koegel et al. ..................... 83/99 |

* cited by examiner

*Primary Examiner* — Omar Flores Sanchez
(74) *Attorney, Agent, or Firm* — Brian D. Bellamy

(57) ABSTRACT

A table miter saw includes a motor assembly and tilt plate assembly holding a blade within a table slot. The blade is mounted to the motor below a table supported by a glide assembly situated within a frame. A handle assembly and the tilt plate assembly are attached to the glide assembly and move the blade longitudinally within the slot. Control knobs operate a shaft to move gears within the tilt plates and change the angle of the blade. A brake lock assembly locks the angle of the blade. The height of the blade is set using a blade height lock in connection with the handle assembly. Mirrored miter fences are connected to the table top with gears for uniform angle change.

12 Claims, 15 Drawing Sheets

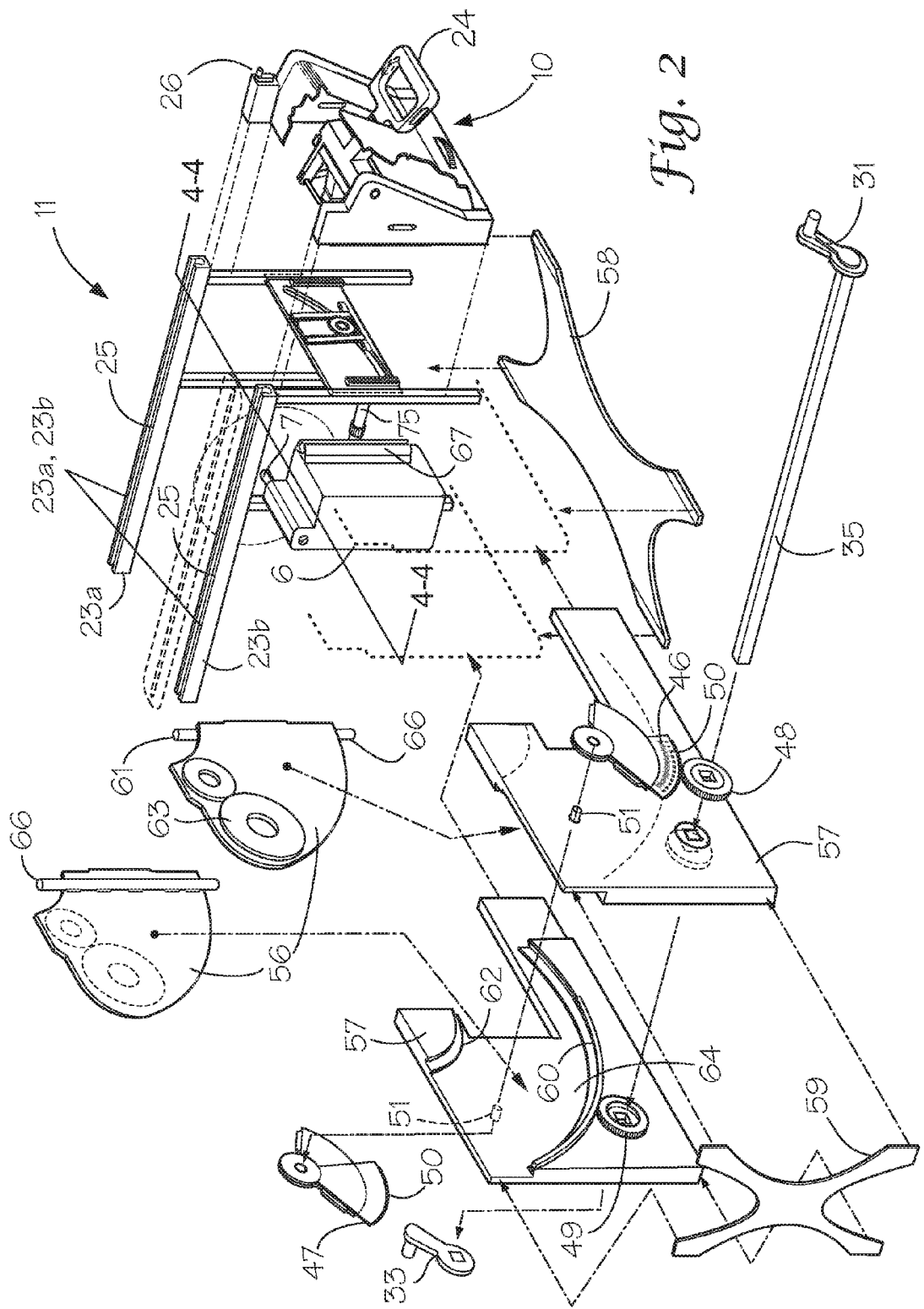

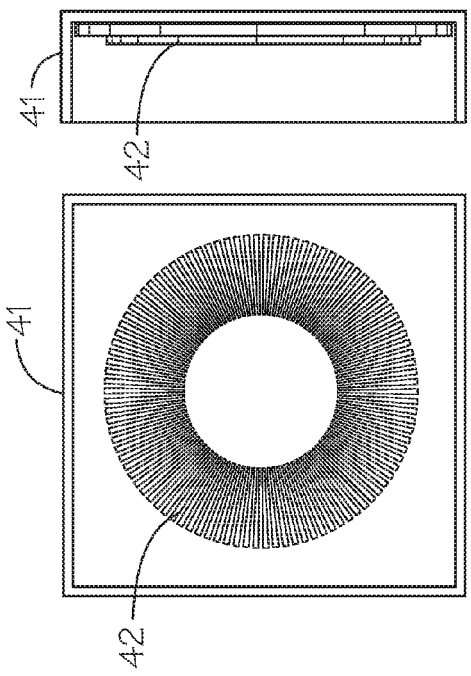
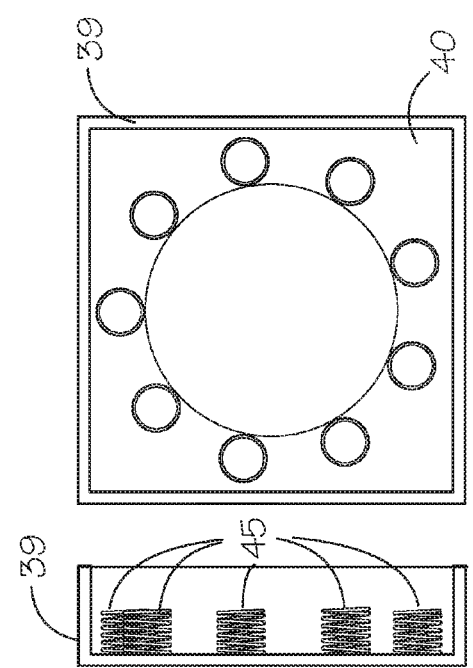
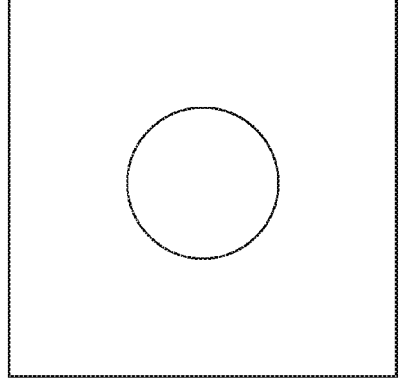
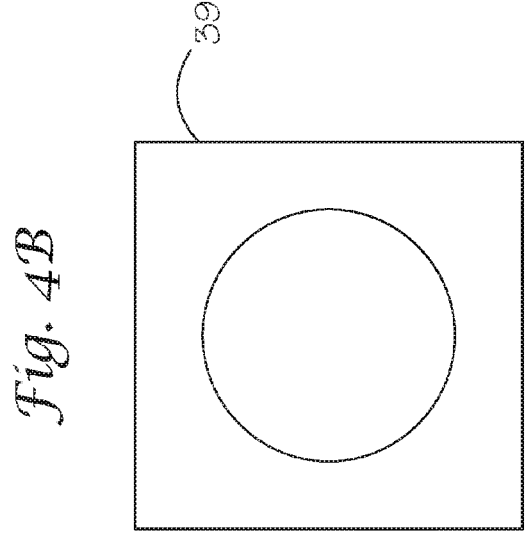
Fig. 4A  Fig. 4B  Fig. 4C
Fig. 4D  Fig. 4E  Fig. 4F

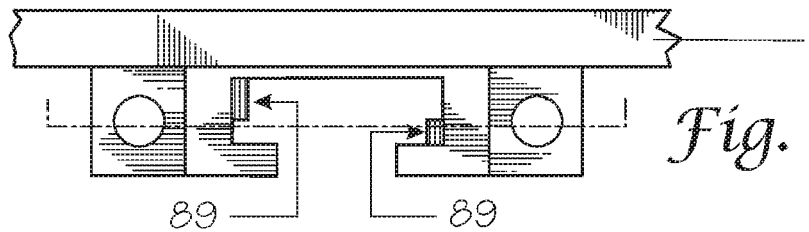
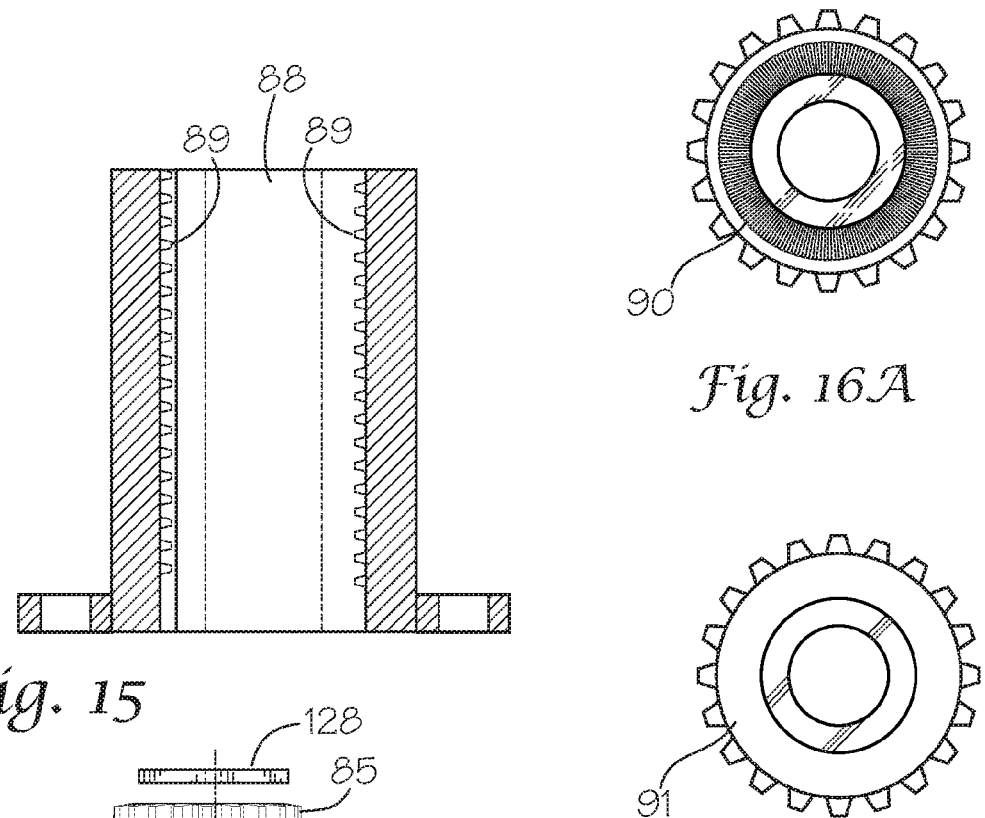
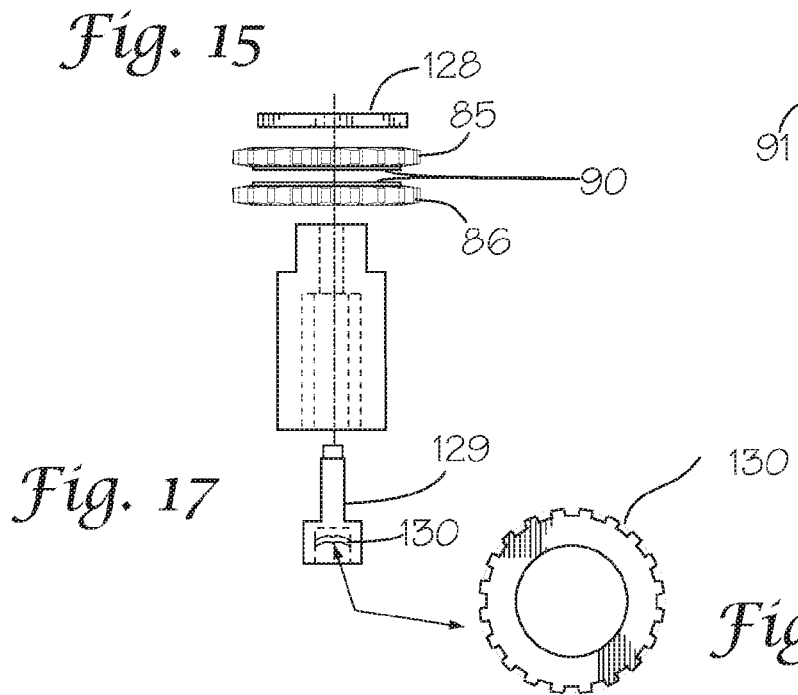

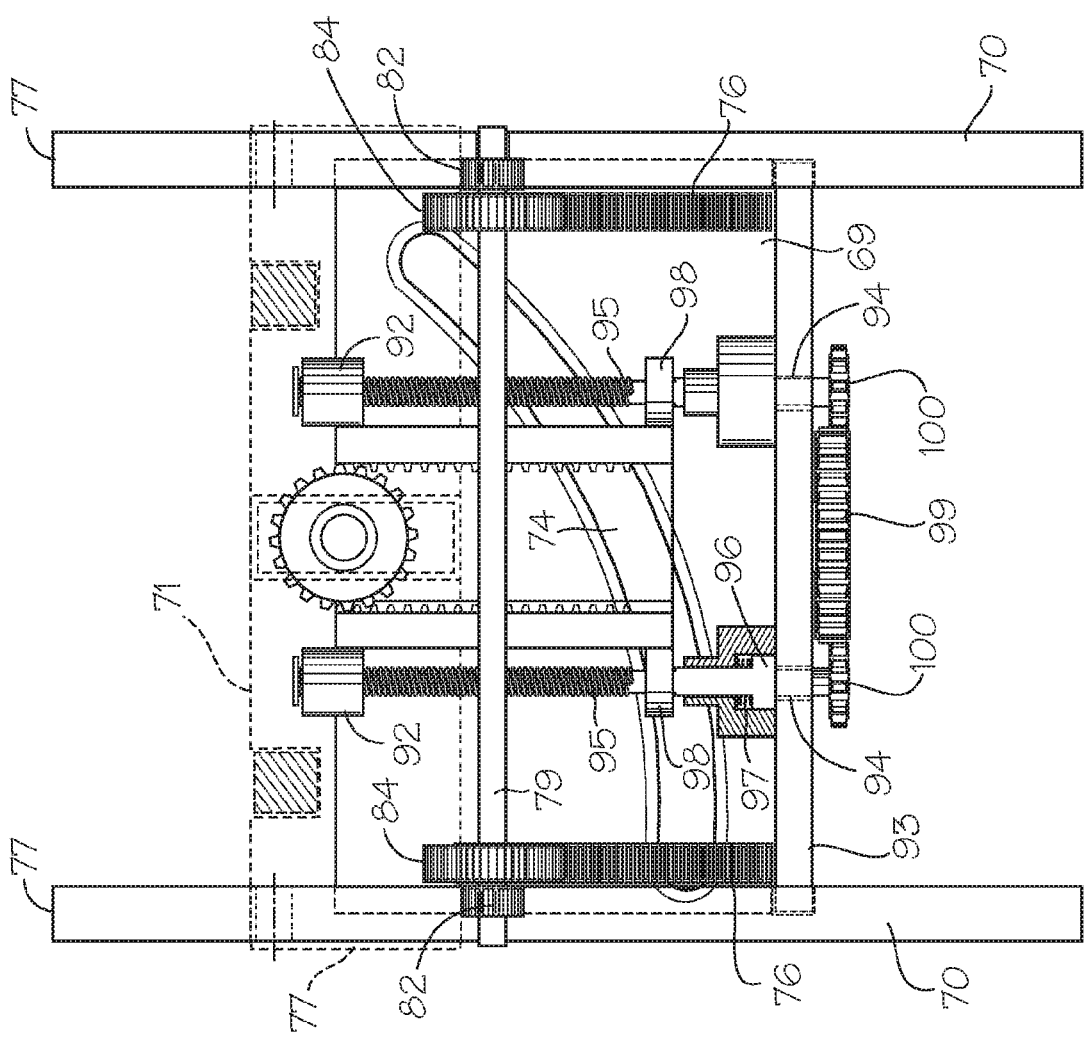

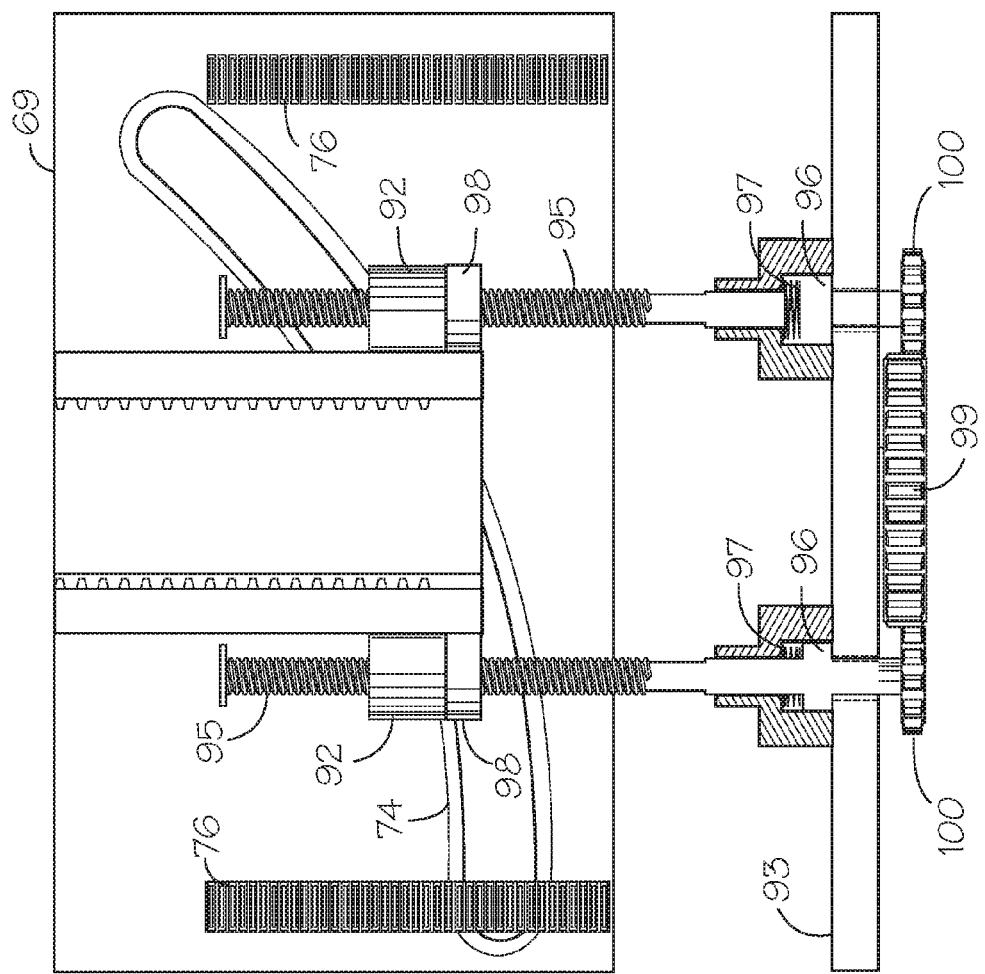

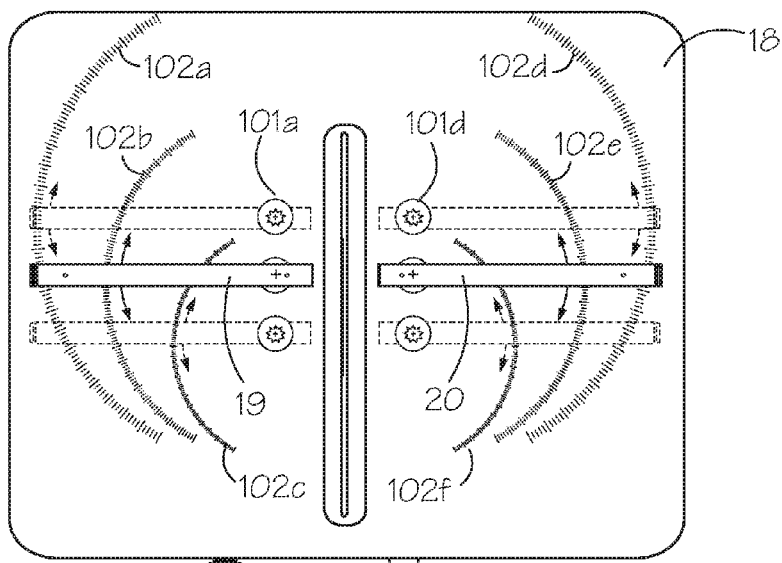
Fig. 24
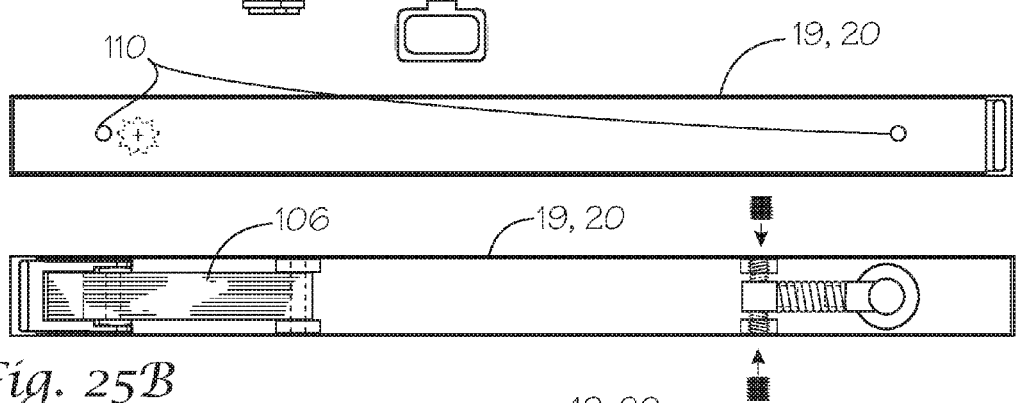
Fig. 25A
Fig. 25B
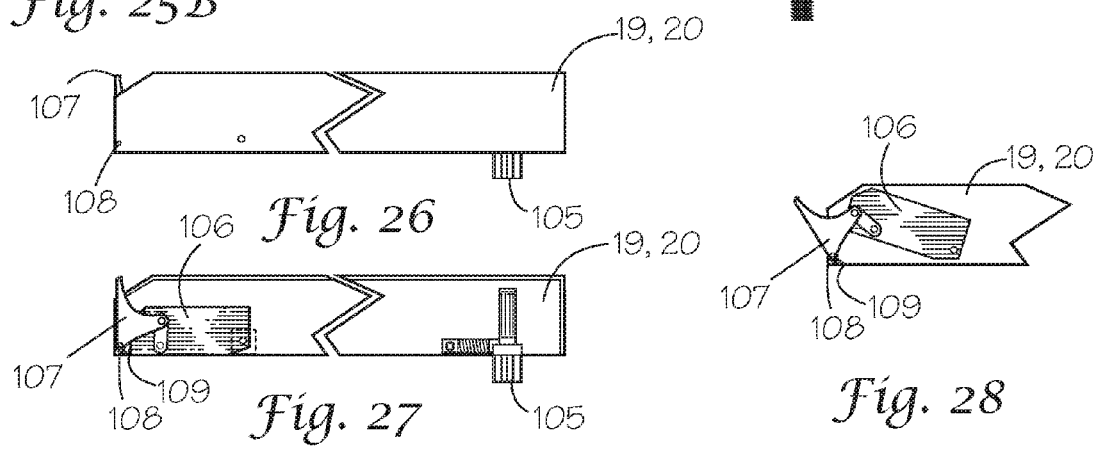
Fig. 26
Fig. 27
Fig. 28

TABLE MITER SAW

PRIORITY CLAIM

The present application claims priority of U.S. provisional patent application Ser. No. 61/372,937 filed Aug. 12, 2010 and entitled "Table Miter Saw."

BACKGROUND OF THE INVENTION

Using a miter saws encounters several limitations in the art that need further improvement. For instance miter saws can only cut a limited depth that is insufficient in some cases, and causes a person to resort to hand sawing or adaptation of a table saw to make the cut. Also, a miter saw usually requires the operator to change the miter saw for each left and right miter cut. Each change increases the potential for operator measuring error in making the correct adjustments and handling the work piece with the needed precision for accuracy. Thus, ongoing efforts are made to improve consistency along with efficiency of accomplishing these miter cuts. Further, as the angle of a miter saw changes, some saws have handles that become awkward to use. A non-ergonomic handle can be unsafe to use because of pulling as an angle, which can force the tool to move toward the direction of the pull.

Table saws have not been very useful in general for miter cuts because of need for the work piece to remain still during a miter cut. Moving a large piece of wood into a saw blade for miter cut will result in a low quality cut. Further, when the angle of a blade is changed on a typical table saw, the centerline of the intersection of the table and blade changes, resulting in inaccurate and difficult angle measurements. Further, typical table saws are very slow for cutting miter joints. In particular, the typical screw device used on a table saw to change blade angle is very slow and is inefficient for using in cutting multiple miter joints. Also, adjusting the fence angle for mirrored miter cuts requires multiple measurements and changes of the fence, causing a large potential for error.

SUMMARY OF THE INVENTION

The present invention provides miter cuts mirroring each other that are correct and identical on both the left and right cuts. The identical mirrored cuts are provided by a pair of miter fences on the table that are interconnected for complementary angular adjustment. The angle of both interconnected fences is adjusted at the same time as the device is set to the desired miter joint angle. Using a T-slide bevel, tracing the area to be trimmed and adjusting the fences to said area, one will attain correct left and right miter joints with one setting. Thus, the present design mirrors an adjustment with one setting using the T-bevel slide to transpose any miter cuts.

The previous common miter saw requires two separate left and right adjustments for miter cuts. There is always error between setting the cuts because of the readjustment of the guide, even if only slight. The present miter saw with interconnected fences requires only one adjustment to set both miter cuts.

A miter saw is provided in which the saw blade is positioned beneath a table, like a table saw, and which performs as an accurate miter saw, as well as a table saw. Dust and debris from the saw is projected away from the user by the rotation of an aerodynamically designed blade away from the user, unlike a typical table saw in which the blade spins towards the user. The blade comes from under and front of the wood, cutting in to the front and top as finish cut and expelling debris away from the operator.

A control handle attached to the below table blade controls the action and movement of the blade, positioning the blade up and down through the table as well as moving the blade horizontally for cutting. Unlike a typical table, the blade is arranged for angular rotation, up and down adjustment, and gliding forward and rearward horizontal movement along about a 12 inch guide. The 12 inch travel of the blade allows for cutting the length of travel plus the full diameter of the blade, about 18 inches from front to rear when at full height. The upward and downward adjustment of the blade allows for cuts up to 3.8 inches deep as either a table saw or miter. The present apparatus has the ability to cut a 2"×12" work piece at a 45 degree angle, which is not possible with most miter saws. The blade is capable of a 55 degree tilt, meanwhile the position of the blade tilt remains centered with the blade and table top. At ninety degrees blade angle tilt, the cut of the blade is 3.6 inches deep. Additionally, in the below-table miter saw blade arrangement, the finish cut is always on the top side of the work. The blade with a laser reflecting off the blade teeth shows the cut, instead of the side of the cut. With the movement of the handle and glide assembly, the blade disappears after the cut is completed. The motion of cutting is constant with the handle to the position of the blade at any angle keeping the force into the cut without swaying the tool.

Additional original features that are supported by the present design include the fence(s) that has/have an attachment an attachment for combination cuts for crown molding trim leaving the blade at 90 degrees if desired or cuts the normal fashion. Also, a quick lock stop, lock height hold, lock slide, and minimal ratio turn blade angle adjustment and lock.

Furthermore, the present design may provide for no electrical cord, and, instead, a male prong plug accepting an extension cord with an duplex GFDI plug as a PTO.

An object of the present invention is to make miter cuts using a below the table saw blade while maintaining the work piece in a static position during cutting to avoid bad cuts.

Another object of the present invention is to provide a saw that functions well as both a miter saw and a table saw.

Another object of the invention is to maintain intersection of the blade centerline with the center point of table slot when adjusted to improve accuracy and minimize width of table slot.

Another object is to provide a faster means to adjust the angle of a blade with respect to a table top.

Another object is to provide a miter saw that will cut deeper than usually provided by a miter arm-saw.

Another object is to provide adjustment of miter fence angle for both left and right miter cuts simultaneously for mirrored cuts to minimize opportunity for measuring errors.

Another object is to provide an ergonomic handle for cutting with a saw that does not become awkward or unsafe to use with the adjustment of the blade angle.

Another object is to provide an improved means for setting the blade height in table saws so that a table saw can be used as an efficient miter saw with table.

Yet another object of the invention is to provide a means for attaching accessories to a miter fence for combination miter cuts and other specialty cuts.

A previous miter saw requires two angle adjustments, left and right, to make a miter cut. An advantage of the present invention is that only one adjustment is made to make both cuts.

A previous miter saw has a motor situated so that the saw is limited to cutting only on the right-hand side. An advantage of the present invention is that the saw design provides clearance on both sides and cuts. Both left and right cuts can be made without further adjustment of blade.

A typical previous miter saw has preset indent stop settings limiting the adjustment of angle to half-degree settings. An advantage of the present invention is that the saw design provides for infinite settings for the angle degree.

A typical previous miter saw providing combination cuts on wood exerts the tool away from the wood. An advantage of the present invention is that the tool provides combination cuts while exerting the tool toward the wood.

A typical miter saw has a 50 degree limit for setting the angle. An advantage of the present invention is the degree setting is unlimited.

A typical miter saw has been the same with two efforts to mirror two cuts. However, an advantage of the present invention is that the design features provide a precise miter with a pair of mirrored cuts while requiring only one effort to trace and set the miter.

These and still further objects and advantages of the invention will be apparent to those skilled in the art.

BRIEF DESCRIPTION OF THE DRAWINGS

FIG. 2 is a perspective assembly view of the tilt plate assembly, motor assembly and handle assembly in accordance with the invention.

FIGS. 4A-4F are front and side section views illustrating the blade angle brake housing.

FIG. 7 is a plan view of control knobs and blade angle gauges for the apparatus.

FIG. 14 is a cut-away top section view of an embodiment of a lift plate with lock gear channel FIG. 15 is a cut-away front section view of lock gear channel.

FIG. 16A is a front plan view of the lock gear front face.

FIG. 16B is a front plan view of the lock gear backside.

FIG. 17 is an assembly top view of an embodiment of pin and gears of the handle assembly.

FIG. 18 is cut-away front section view of the lifting arrangement for control of the blade height in accordance with an embodiment of the invention.

FIG. 19 is a cut-away front section view of the lifting arrangement for control of the blade height in which a height stop is set according to an embodiment of the invention.

FIG. 24 is a top elevation view of the table top and miter fence arrangement in accordance with the invention.

FIG. 25 is a top and bottom plan view of a miter fence constructed in accordance with the invention.

FIG. 26 is a side elevation view of the miter fence.

FIG. 27 is a side section view of the miter fence.

FIG. 28 is a side section view of the miter fence lever and magnet.

DETAILED DESCRIPTION OF THE INVENTION

Figure 1:
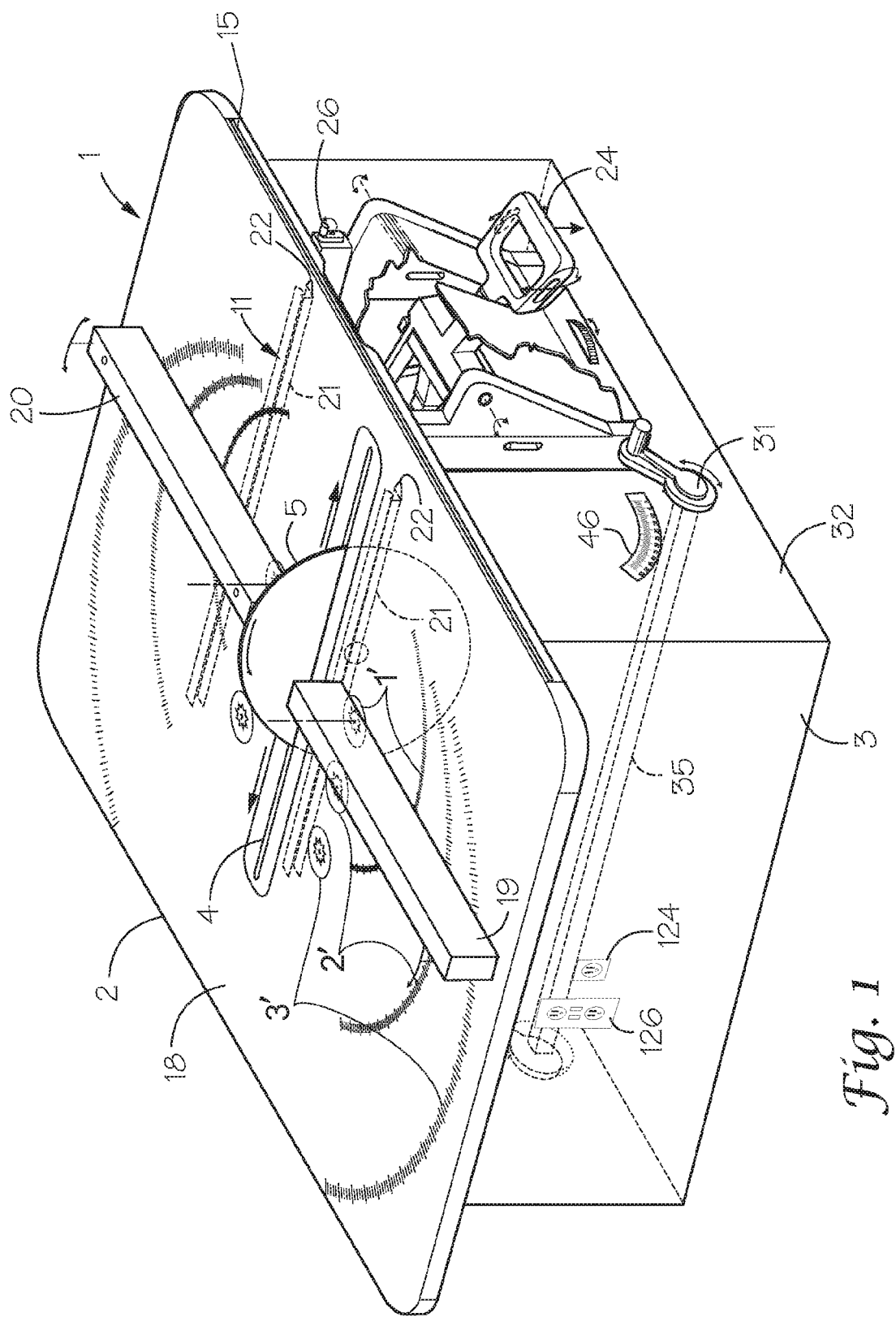
FIG. 1 is a perspective view of a saw apparatus in accordance with the present invention.
Figure 3C:
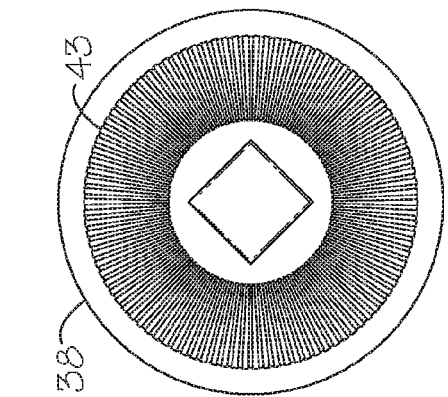
FIG. 3C is an outside surface plan view of the lock plate.
Figure 3A:
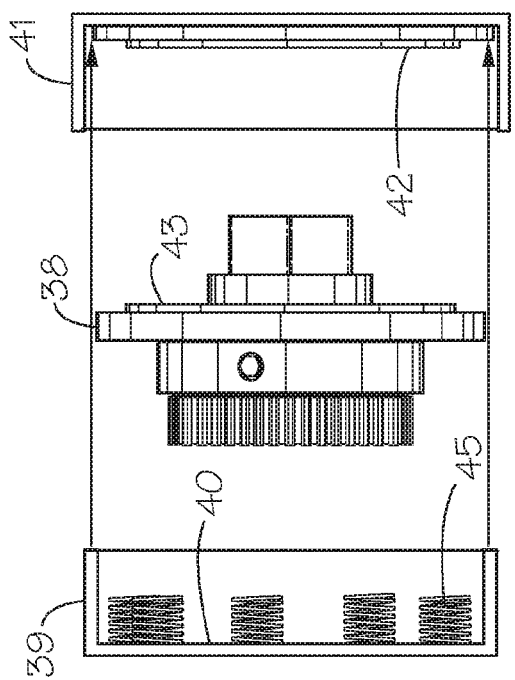
FIG. 3A is an assembly view of a blade angle brake in accordance with an embodiment of the invention.
Figure 3D:
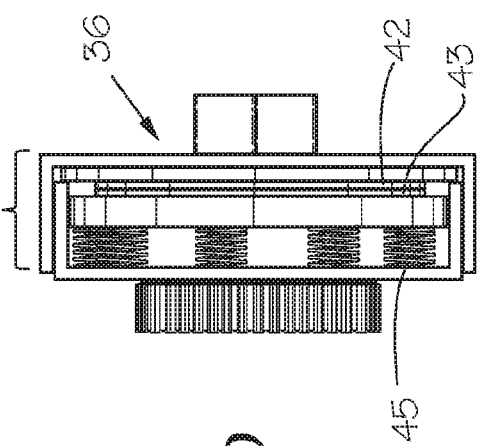
FIG. 3D is a cut-away section view of the blade angle brake in an engaged position.
Figure 3B:
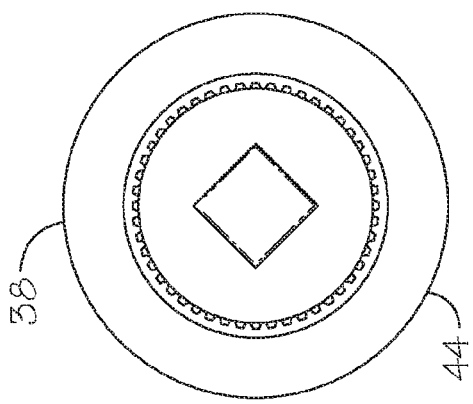
FIG. 3B is an inside surface plan view of a lock plate in accordance with an embodiment of the invention.

FIG. 1 shows a saw 1 having a table saw form factor while functioning as an improved miter saw. The improved miter saw has table top 2 supported by frame 3 with an elongate slot 4 arranged near the center of the table top to receive rotating blade 5. The blade 5 is attached to a motor 6 below the table top 2 via an extended motor shaft 7, whereby the motor rotationally drives the blade. The motor 6 and blade 5 are arranged within a motor assembly 8 that is connected to a tilt plate assembly 9 that provides for angular adjustment of the blade. Handle assembly 10 is attached to the motor assembly 8 to raise and lower the blade 5 for height adjustment thereof. The combination of motor 6 and blade 5 and the motor assembly 8 are moved longitudinally below the table top 2 by attaching the tilt plate assembly 9 and handle assembly 10 to the table by a carriage assembly 11. By this arrangement the saw 2 can function as a miter saw or a table saw.

Figure 29:
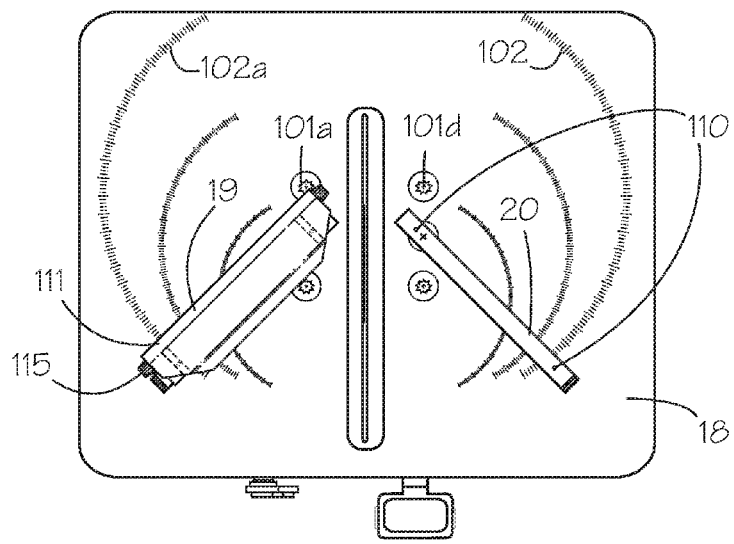
FIG. 29 is a top elevation view of the table top and miter fence arrangement in accordance with an alternative embodiment of the invention.
Figure 30A:
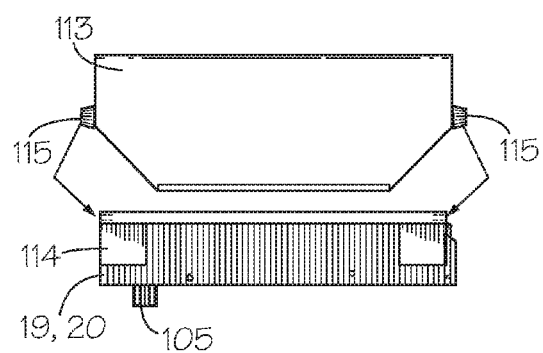
FIG. 30A is a front side assembly view of the miter fence and alternative attachment of FIG. 29.
Figure 31A:
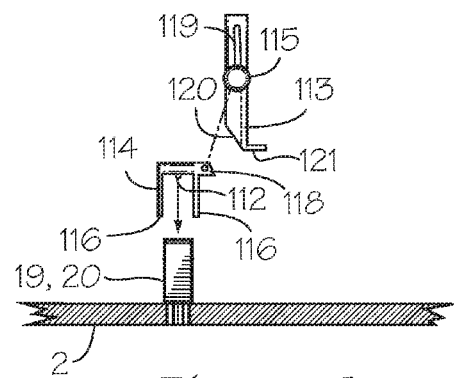
FIG. 31A is an end section assembly view of the miter fence and alternative attachment of FIG. 29.
Figure 30B:
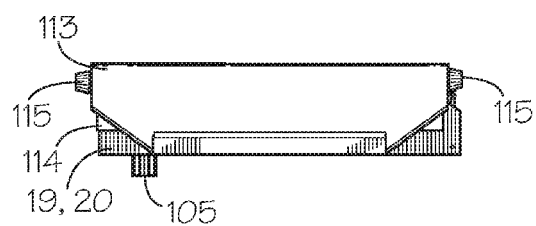
FIG. 30B is a front side elevation view of the miter fence and alternative attachment of FIG. 29.
Figure 31B:
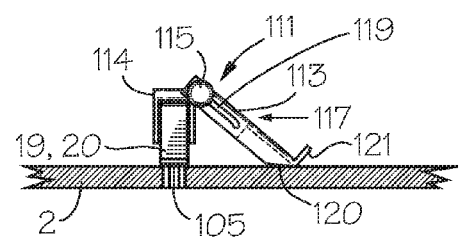
FIG. 31B is an end section view of the miter fence and alternative attachment of FIG. 29.
Figure 32:
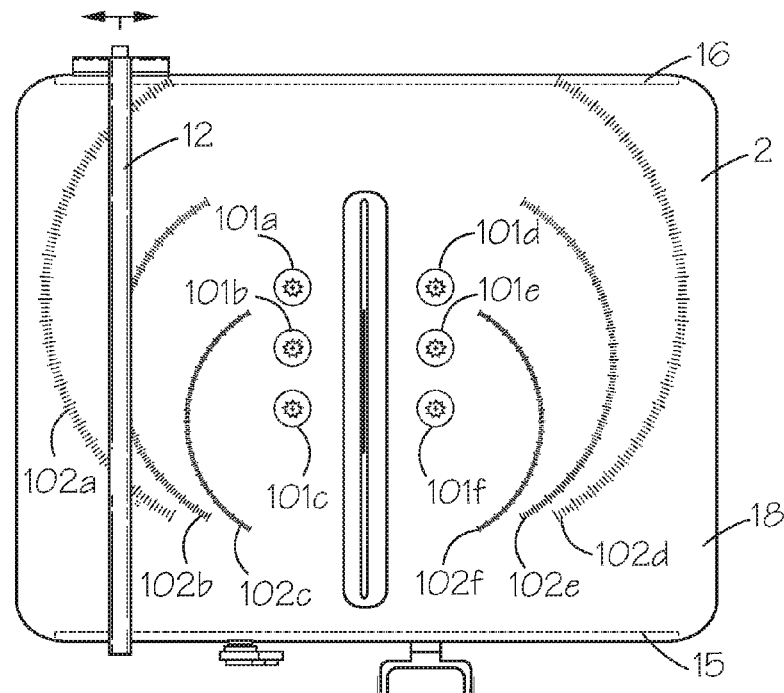
FIG. 32 is a top elevation view of the table top and rip fence in accordance with an alternative embodiment of the invention.
Figure 33:
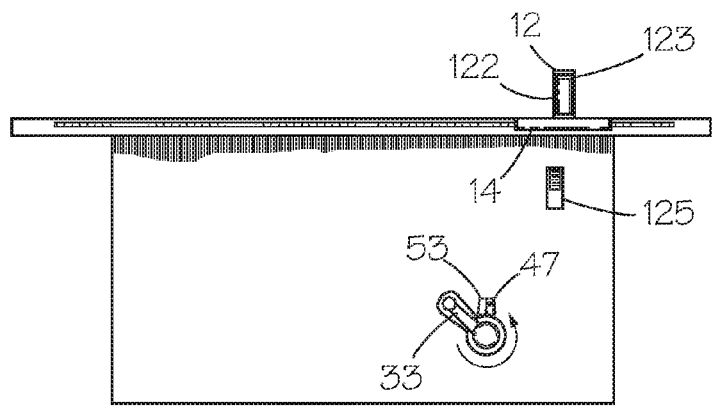
FIG. 33 is a side elevation view of the saw apparatus with rip fence.
Figure 34:
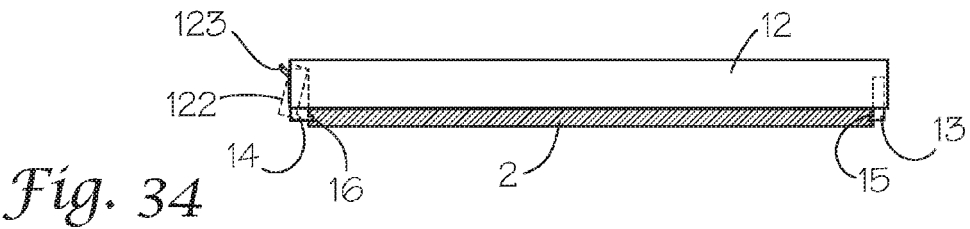
FIG. 34 is a side section view of the table top and rip fence.

The table top 2 shown in FIG. 1 may function as a table for action as a table saw and includes a means for a attaching a rip fence 12 and rip fence guide 13, 14. As shown in FIG. 1 the rip fence attachment means may include a rip fence track 15, 16 for insertion of the rip guide 13, 14, and a rip fence rule 17 may be imprinted along the external edge of the table about the rip fence track. FIGS. 29-31 illustrate the rip fence arrangement in further detail. Referring back to FIG. 1, the table top 2 further includes a large flat top surface 18 for supporting the work. The table top 2 is supported by the frame 3 as depicted by the outer walls of the sub-frame, and the frame 3 is reinforced by structural members as needed. When used in the miter saw arrangement, the table top 2 shown in FIG. 1 further includes a pair of elongate miter fences 19, 20, also referred to as dual miter fences. These miter fences 19, 20 are geared to one another for precision and cooperative operation during miter adjustment. The miter fences 19, 20 are situated with one on the left side of the table and one on the right side of the table.

The rotating saw blade 5 is moved by the carriage assembly 11 as the carriage assembly slides on left and right glide members 21 to move the blade 5 longitudinally within the table slot 4. The glide members 21 shown are about 12 inches in length and arranged beneath the table top 2 as shown in FIGS. 1, 2 and 16. The glide members 21 are attached to the table top 2 with a downward male glide track 22 on each for engaging and receiving left and right slide bars 23A, 23B as shown in FIG. 18. The slide bars 23A, 23B are attached at the top of the carriage assembly 11. A female receiving channel 25 on the slide bars 23A, 23B engage the male glide track members 21 and slide along those male glide tracks to and fro to move the blade 5 forward and rearward in the table slot 4 by pushing and pulling on the handle 24. The position of the blade 5 within the table slot 4 can be fixed using a locking device comprising a horizontal slide stop 26 in combination with a slide bar lock pin 27 to prevent sliding of the carriage assembly 11 forward or backward.

Figures 23A, 23B, 23C:
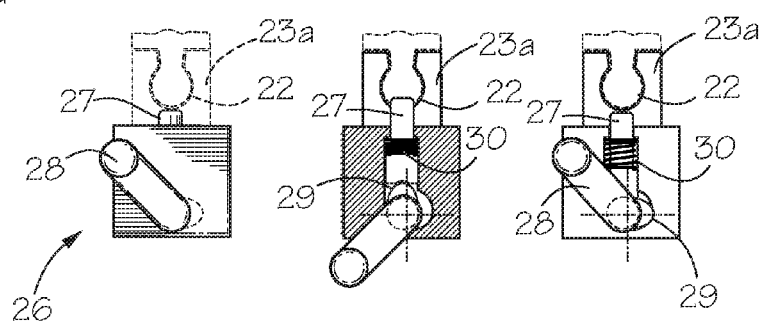
FIG. 23A is a front plan view of a glide lock in accordance with an embodiment of the invention.
FIG. 23B is a cut-away front section view of the glide lock in FIG. 19A in locked position.
FIG. 23C is a cut-away front section view of the glide lock in FIG. 19A in unlocked position.

In the embodiment shown in FIGS. 23A-23C, the right slide bar 23A includes the locking device to prevent forward and backward sliding of the carriage assembly 11 on the glide tracks 22. The unlocked position of the locking device is shown in FIG. 23A. In the locked position shown in FIG. 23B the locking device the lock pin 27 engages the horizontal slide stops 26 within the glide track 22. The stops 26 are set within the respective glide track 22 at 1 inch on center intervals as shown in FIG. 16. Using the lock pin 27 to stop horizontal movement of the blade 5 may be used for either miter or table saw functions, but is specifically useful for use of the table saw functions of the device, wherein fixing the horizontal position of the blade 5 is needed.

The stop 26 comprising the lock pin 27 is operated using a lock lever 28 to change the condition of the pin. The lock lever 28 is turned to move the pin 27 upward into engagement with the glide track 22, which locks the horizontal position of the blade 5 and stops the gliding of the carriage assembly 11. The lock lever 28 uses a cam 29 that is moved by the lever to engage the pin 27 and push the pin upward when the lever is moved to the locked position. This compresses the spring 30 as shown in FIG. 23B. The lock pin 27 may be disengaged from the glide track 22 to unlock horizontal movement and permit gliding by turning the lock lever 28 to the unlocked position, which releases the engagement of the pin with the cam 29 and allows the spring bias to push the pin downward as shown in FIG. 23C. The locked position is especially useful for table saw use, while the unlocked position is especially useful for miter saw functions.

The carriage assembly 11 operates as a unit to allow sliding movement of the blade 5 within the table slot 4. The carriage assembly 11 is arranged to provide for effective miter saw operation by arrangement of the tilt means, blade and motor mount means and lift and movement handle means into a synergistic combination. The combination comprising the carriage assembly 11 includes the tilt plate assembly 9, motor assembly 8 and the handle assembly 10 and is shown in part by the assembly drawing of FIG. 2.

The tilt plate assembly 9 allows modification of the blade angle within the table slot 4 while maintaining the blade 5 within the center of the slot 4 for consistency and accuracy of miter cuts. The blade angle is adjusted using a control knob 31 available on the miter side 32 or a control knob 33 on the table side 34 of the saw 1. The control knobs 31, 33 are attached to either end of a square shaft 35 on which the tilt plate assembly 9 travels during longitudinal movement of the blade 5 via the carriage assembly 11. The control knobs 31, 33 adjust the angle of the blade 5 through adjustment of the tilt plate assembly 9, which controls the position of the motor assembly 8. The control knobs 31, 33 operate on each side of the saw 1 for both miter saw and table saw adjustments in increments of 55 degrees for each 0.6944 revolutions that the control knob turns.

Once in the desired position the blade angle is set using a brake 36 that is controlled by the control knobs 31, 33. The brake 36 for the blade angle includes an assembly having a brake housing 37 and spring-loaded lock plate 38 within the brake housing. The lock plate 38 contacts an inside surface of the brake housing to hold the blade angle in fixed position via the brake 36. The lock plate 38 is attached to the control knob 31 for movement to lock and unlock the brake 36. In particular, the lock plate 38 is spring loaded and movable inward and outward from the opposing inside surface 42 of a brake housing member 41, referred to herein as the second brake housing member 41, to unlock the brake 36. In order to lock in place the rotation of the control knob 31, the inside surface of the lock plate 38 has a knurled surface 43 for engaging and locking to the inside surface 42 of the second brake housing member 41, i.e., the fixed lock plate surface 42. The outside surface 44 of the lock plate 38 engages springs 45 that bias the lock plate to the locked position.

The brake housing 37 is attached to the frame 3 of the apparatus and the control knobs 31, 33. The brake housing 37 includes first housing member 39 and second housing member 41 discussed above. These housing members are arranged opposite each other with opposing facing inside surfaces 40, 42 and brought together to enclose the lock plate 38 and springs 45. The first housing member 39 has a first inside surface 40 and an inner housing area is provided for holding and housing springs 45 for spring loading the lock plate 38 of the brake 36.

By engaging the inside face 40 of the first housing member 39 and the outside surface 44 of the lock plate 38, the springs 45 close the brake 36 by biasing the lock plate closed to hold the blade angle. The fixed lock plate surface on the inside surface 42 of the second housing member 41 is knurled like the inside surface 43 of the lock plate 38. These knurled surfaces 42, 43 contact each other when the lock plate 38 is closed, engaging the brake 36 and preventing turning of the control knobs 31, 33. The lock plate 38 is released from the second housing member 41 by the release function of the control knob 31. On the miter side 32 of the saw 1, the release function is performed by pushing the control knob 31 inward. Thereby, the lock plate 38 is separated from the second brake housing's knurled inside fixed lock plate surface 42. This separation between the lock plate knurled surfaces 42, 43 allows turning of the control knob 31 to change the blade angle. Releasing the pushing pressure manually applied to the control knob 31 allows the lock plate surfaces to engage and lock the blade angle position by the operation of the springs 45 within the brake housing 37.

The control knobs 31, 33 in FIG. 2 are tied to a square shaft 35 shared by both control knobs for both miter and table adjustments. Measurement gauges 46, 47 is provided on both the table side 34 and miter side 32 for showing the angle of the blade 5. Gears 48, 49 on each end of the square shaft 35 on the inside of each respective control knob 31, 33 drives each gauge 46, 47. On the miter side, the measurement gauge gear 46 is located on the brake housing 37. The measurement gear 46 shown attaches to the lock plate 38 of the brake 36 to rotate as the lock plate 38 is loosed from the housing 37 and rotated via the control knobs 31, 33. Each measurement gauge 46, 47 includes a toothed curved edge 50 for engaging the measurement gauge gears 48, 49. The toothed curved edge 50 moves the position of the gauge by rotation on a pin 51 that is fixed to the apparatus. Each measurement gauge 46, 47 moves with respect to a measurement pointer 52 to show blade angle on the gauge on both sides of the saw as operated upon by the respective gear 48, 49, and the angle of the blade angle measured by each gauge is shown through a viewing window 53 on the apparatus displaying the gauge and the degrees of blade angle on the gauge marked by the measurement pointer.

The control knobs 31, 33 operate the square shaft 35 to change the angle of the blade 5 using a series of gears in combination with the tilt plate assembly 9. First, shaft gears 54 for controlling angle are mounted on the square shaft 35 for engaging gears to move the tilt plate assembly 9 and control the blade angle. In particular, the shaft gears 54 slide around the square shaft 35 and are arranged to operate gears in tilt plate units 55A, 55B on either side of the tilt plate assembly. The square tube of the shaft 35 ties together the two shaft gears 54 to operate the gears in each tilt plate unit 55A, 55B.

The tilt plate units 55A, 55B each include a kidney shaped tilt plate 56. These tilt plates 56 are supported by a pair of main plates 57 that are welded together into the tilt plate assembly 9, and said main plates are structurally supported by a cross-member 58 connecting the bottom of the main plates and by connecting members 59 or posts. The tilt plates 56 provide a cooperative pair that moves with little resistance within a ribbon gear track 60 formed within a channel in each of the main plates 57. Each tilt plate 56 is held within a channel in each respective main plate 57. Each of the tilt plates 56 includes a pair of meshed circular gears. An inner small circular gear 61 of the pair engages a toothed gear track 62 on the upper portion of the curved upper inner circumference of a recess in the main plate 57. The large circular gear 63 of the pair of meshed gears on the tilt plate 56 engages the ribbon gear track 60 situated in a channel on the lower portion of the curved inner circumference of the recess on the main plate 57. The toothed ribbon gear track 60 and the toothed gear track 62 on the upper portion of the main plate 57 form a pair of tilt track gears for receiving the tilt plate's meshed circular gears. Each tilt plate 56 is retained by a channel 64 within the respective main plate 57. The ribbon gear track 60 engages the large circular gear 63 to move the tilt plate 56 within the main plate 57. Thus, the tilt plate 56 provides a kidney gear engaged by the shaft gears 54 via the tilt track gears. The shaft gears 54 turn to operate the ribbon gears which in turn will cause the large circular gear 63 of the tilt plate 56 to turn and likewise turn the small circular gear 61. The turning of the circular gears moves the tilt plate 56 to change the blade angle. The size of the circular gears is calibrated in accordance with the circumference of the tilt track gears to provide smooth resistance free movement.

The tilt plates 56 are joined together by a stiffener plate 65 and are attached to the motor assembly 8 for rotation of both the motor 6 and blade 5 as the tilt plates operate. Therefore, a connection means attaches the tilt plates 56 to the motor 6. As shown in FIG. 3 the connection means may comprise a shaft 66 on the front edge of each tilt plate. Further, the motor assembly 8 may include a pair of structural sleeves 67 attached to the motor housing that receive the shafts 6 of the tilt plates 56, whereby the motor housing is attached to the tilt plates. The motor assembly 8 may move along the shafts 66 of the tilt plate 56 for adjustment of the blade height within the table slot 4. The tilt plates 56 include a toothed edge 68 for receiving gears for lifting the motor assembly 8.

Figures 5, 7A, 7B:
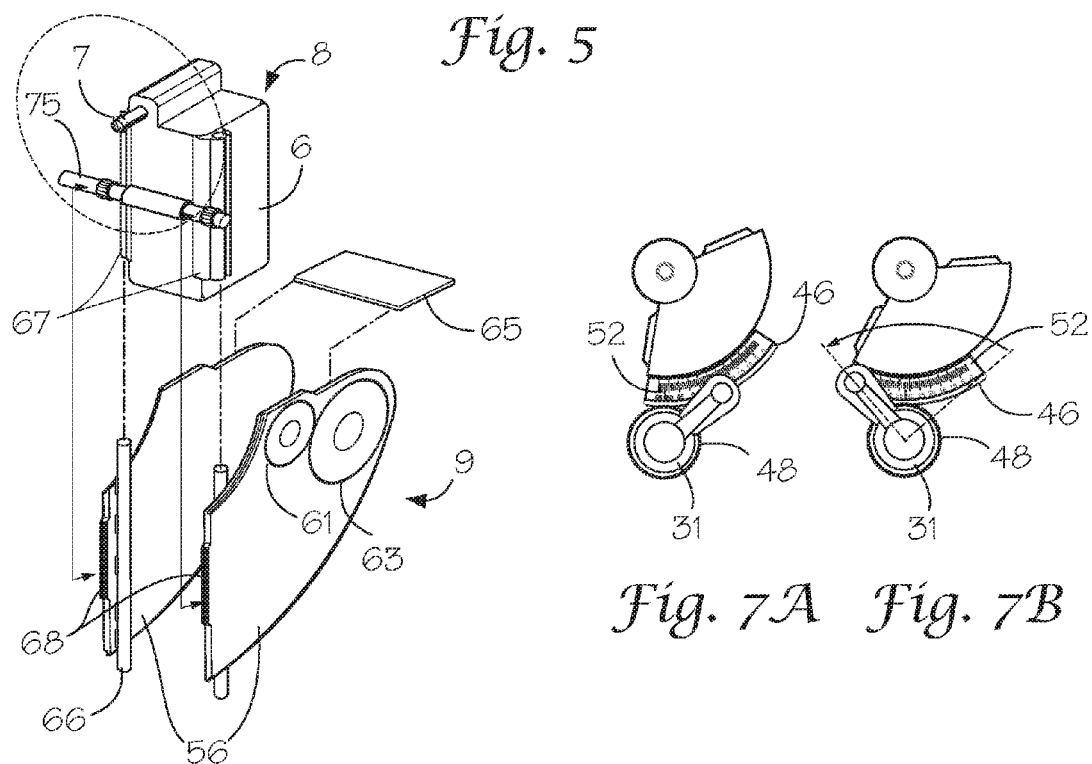
FIG. 5 is a perspective assembly view of the tilt plate and motor assembly.

The tilt plates 56 support the motor housing independent of the saw's frame 3 for angular rotation of the entire motor assembly 8 and blade 5. The arcs for adjustment of the blade angle are drawn off of the center-point of the table and blade 5. Accordingly, the blade intersection with the table top 2 does not change the center line of the blade 5 as the blade angle changes. Instead, the center of the blade 5 maintains a constant point of intersection with the table top 2 as shown in FIG. 4, which permits miter cuts without the need for adjustment because of changes in the point of table top intersection caused by angular adjustment of the blade 5. The angle of the blade is changed very easily using the control knobs 31, 33, which require very little turning for a large degree of blade angle change as illustrated in FIG. 5.

The handle 24 shown in FIG. 1 is a part of the handle assembly 10 that controls the elevation of the blade 5 and the longitudinal movement of the blade within the table slot 4. The handle 24 provides an ergonomic grip for the user's hand to operate the saw blade 5. In the particular embodiment of the invention shown, the handle 24 is maintained at a determined angle regardless of the blade angle adjustment. Thus, the handle remains in a preferred ergonomic position during use.

Figure 8:
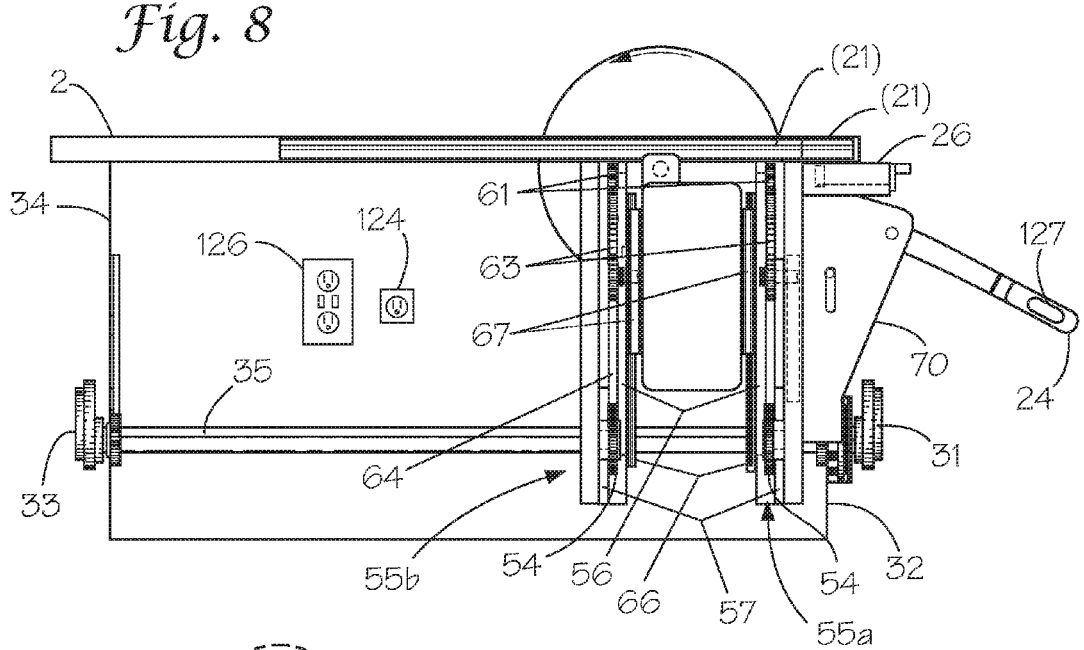
FIG. 8 is a cut-away section view of the saw apparatus illustrating the relation of the tilt assembly with square shaft and control knobs, as well as the handle assembly.

The handle assembly 10 shown in FIG. 8A includes the handle 24 connected to elevation lift plate 69 for changing the blade height through vertical movement of the handle. In operation, once the blade height is set for a particular cut with the saw, the handle 24 has only horizontal sliding movement along with the overall carriage assembly 11, of which the handle assembly 10 is an interconnected part. The handle 24 is connected to a housing structure comprising transmission walls 70 on each left and right side of the handle supported by cross-member supports 71. A bracket 72 extending from each transmission wall 70 provides a point of attachment for a crossbar 73 of the handle 24. The crossbar 73 acts as a pivot fulcrum for operation of the handle 24 to lower and raise the blade 5. As lifting or lowering force is applied to the handle 24, gears in the transmission walls 70 move.

Figure 6:
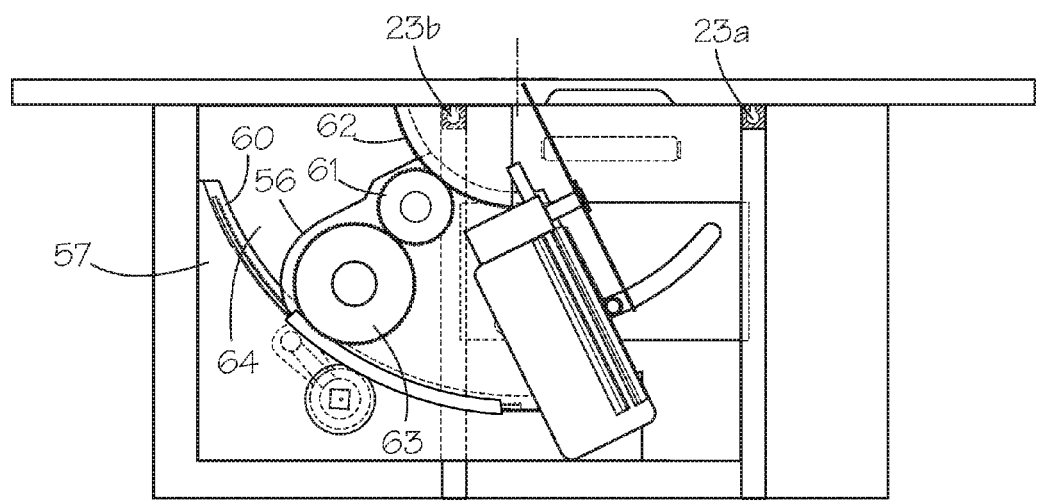
FIG. 6 is a cut-away plan view of the tilt plate assembly and motor assembly in relation to the saw apparatus.

As the gears in the transmission walls 70 move, the handle 24 moves the lift plate 69, which operates the height of the blade 5 so that the handle angle remains constant. The elevation lift plate 69 includes a banana shaped curved channel 74 for supporting a support shaft 75 that operates the height of the motor assembly 8 and blade 5. The curved channel 74 corresponds with the angle of the blade 5 and travel of the motor assembly 8 with respect to tilt angle and height. The transmission wall gears engaged with the handle 24 includes a major gear 84 on each side and a minor gear 82 with respect to each major gear. The major gears 84 are each situated on the handle assembly 10 in connection with the lift plate 69 to engage teeth 83 on each side of the lift plate 69 that receive the major gears. The major gears 84 move the lift plate 69 as the handle 24 is raised and lowered to affect the height of the blade 5. The ratio of control of movement to the movement by the combination of handle 24 and lift plate 69 is nearly equal to movement of the blade 5. As shown in FIG. 6 and FIG. 7, the lift plate 69 moves upward when the handle 24 is moved down, and the lift plate moves downward when the handle is moved up. In other words, the upward movement of the lift plate 69 raises the blade height as shown in FIG. 6, and the downward movement of the lift plate lowers the blade height as shown in FIG. 7. As shown in FIG. 6, the position of the blade 5 can be locked in horizontal position while the blade in is raised within the table slot 4 for use of the saw as a table saw. Thus, the blade 5 may be raised by the handle 24 and locked in the center of the table for typical table saw cuts using a rip fence 12 as described hereinbefore.

FIG. 8A illustrates in further detail the relation of the handle assembly 10 to the lift plate 69 and transmission walls 70. Posts 77 with channels 78 are provided on the ends of the transmission walls 70 for attachment of the lift plate 69 between these posts. The lift plate 69 travels vertically in the post channels 78 of the transmission walls 70 and move the motor height control shaft 75 up and down. The range of movement of the lift plate 69 is controlled by the channels 78. The posts 77 attach to the transmission walls 70 and additional support members as needed. The handle assembly 10 may connect to the glide members 21 by the attachment of the top of the posts 77 or transmission walls 70 to the glide members 21 for sliding on the bottom of the table top 2.

The handle 24 engages the transmission wall 70 as shown in FIGS. 8A and 8B by an arrangement of the transmission gears and gear shaft 79 in the walls. The arrangement is shown in further detail in FIGS. 9 and the top view of 10. The transmission walls 70 each include a track opening 80 through the transmission walls that the gear shaft 79 inserts into for movement up and down. Each track opening 80 is arranged within a channel 78 in the transmission walls 70 that receives a minor transmission gear 82 within the channel 81. The channels have teeth 83 that engage the minor transmission gear 82 as shown in FIG. 8B. The minor transmission gears 82 are arranged on the handle's gear shaft 79 along with larger major transmission gears 84. While the minor transmission gears 82 control movements within the transmission walls 70, the major transmission gears 84 control the movement of the lift plate 69 as the minor transmission gears 82 move by engaging the teeth 83 on the transmission wall channel as discussed above.

Figure 9:
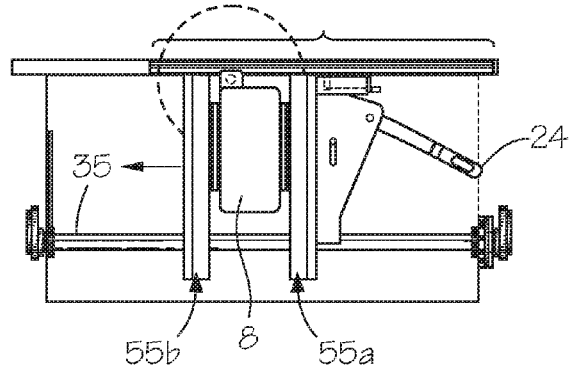
FIG. 9 is a cut-away section view of the saw apparatus illustrating forward sliding movement of the blade for cutting miter or locking the blade for table saw use.
Figure 10:
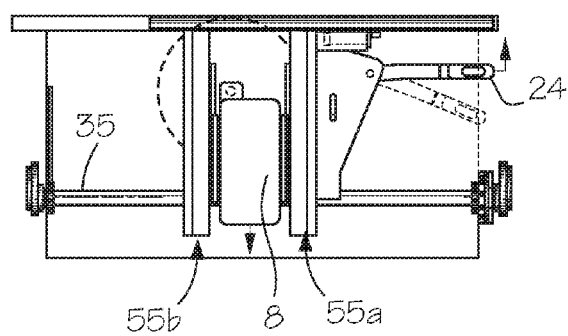
FIG. 10 is a cut-away plan view of the saw apparatus illustrating blade height adjustment in accordance with an embodiment of the invention.
Figures 11A, 11B:
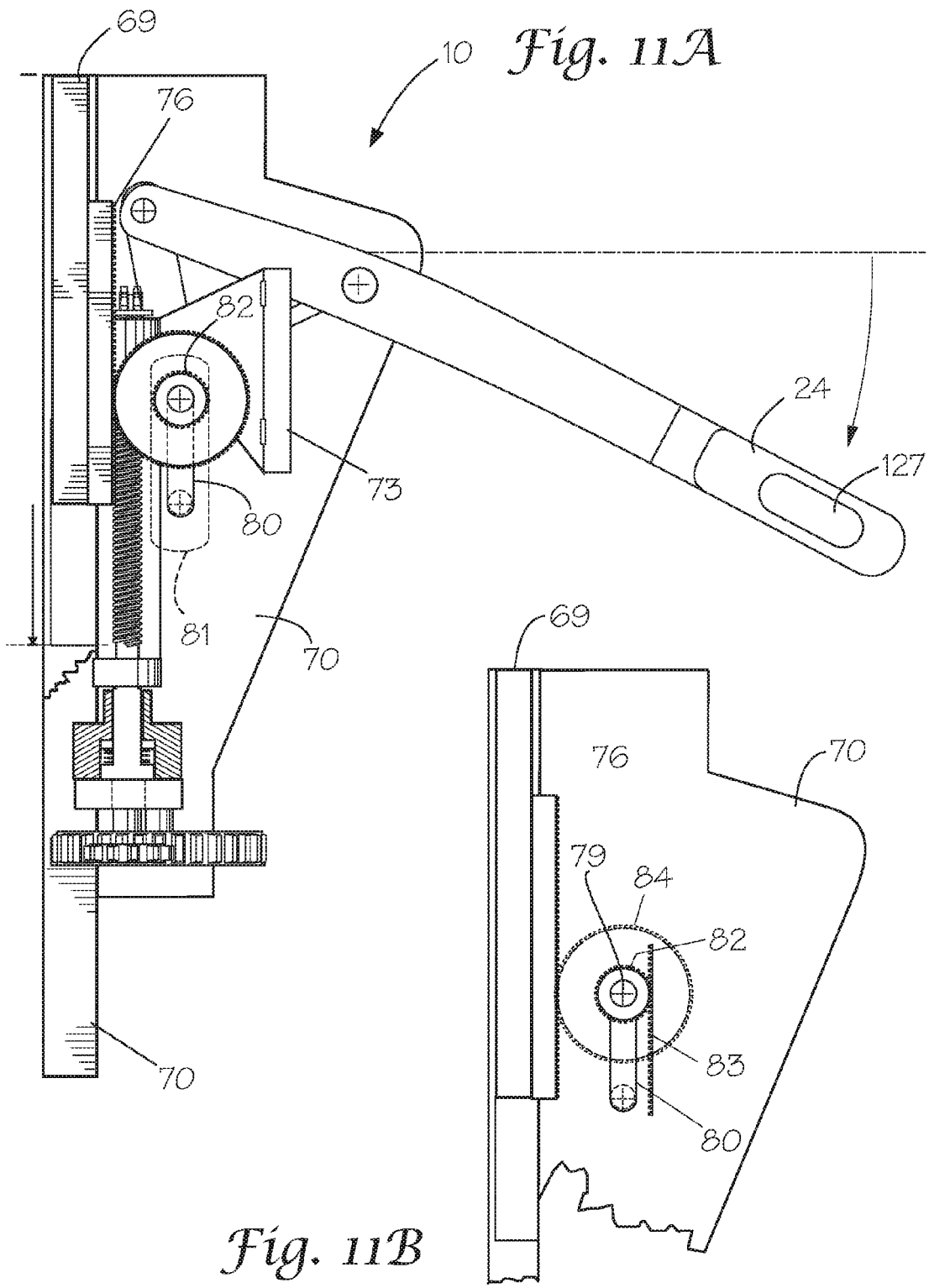
FIG. 11A is a cut-away section view of the handle assembly according to an embodiment of the invention.
FIG. 11B is a cut-away section plan view of the handle transmission according to an embodiment of the invention.

The handle 24 is also used to lock the blade height using a blade height lock that requires only a twist of the handle to operate. The blade height lock is illustrated in FIG. 8A and FIGS. 9-10. Portions of the blade height lock are shown enlarged in FIGS. 12-15B. The blade height lock includes two gears 85, 86 forming a locking gear set. The turning of the handle 24 turns a shaft 87 to move a pull plate 128 as shown in FIGS. 10-11. The shaft pulls the pull plate 128 by movement of the pull member 129 that is attached to the pull plate. Pull plate 128 pulls the two gears 85, 86 together to lock the movement of the handle 24 with respect to the lift plate 69. A pull gear 130 within a chamber of the pull member 129 turns within a spiral or threaded guide as the handle turns the pull gear to move the pull member.

Figure 12:
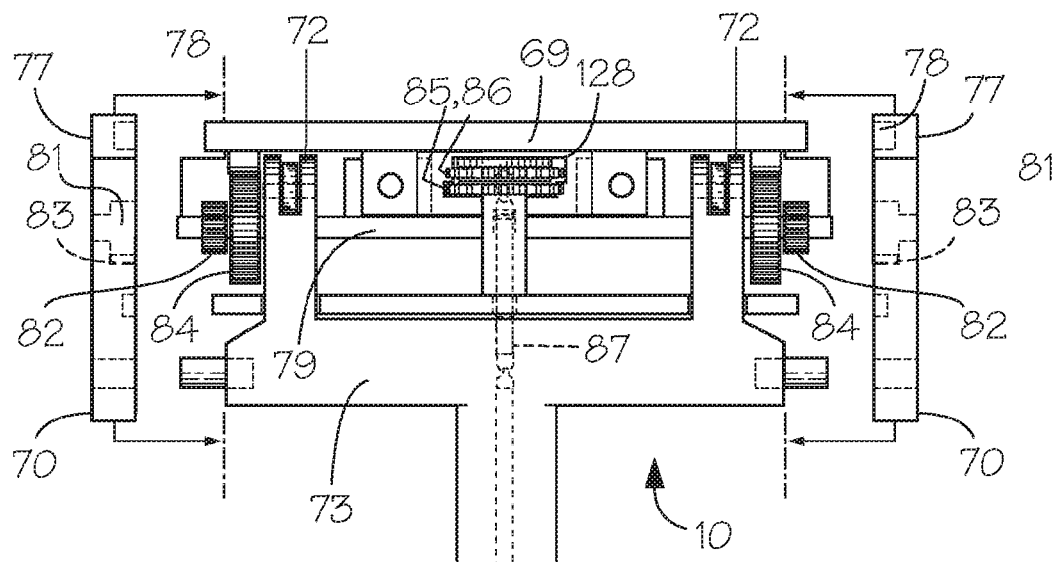
FIG. 12 is a cut-away top plan view of the handle assembly.
Figure 13:
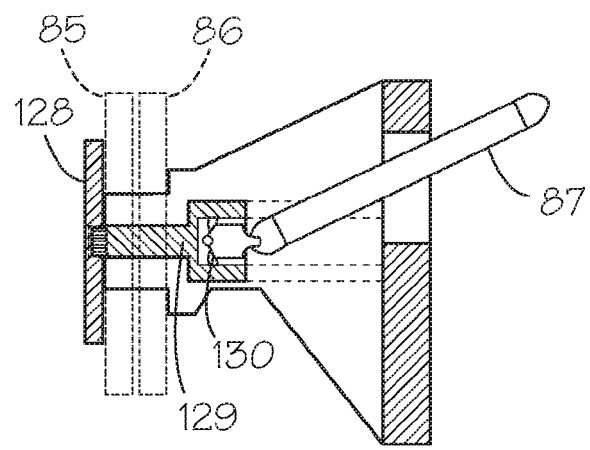
FIG. 13 is a cut-away section view of the shaft and plate for setting blade height using the handle assembly.

The two gears 85, 86 are attached to the lift plate 69 within a toothed channel 88 within the lift plate. The gears 85, 86 remain disposed in opposing relation and move up and down in the lift plate channel 88 when the handle 24 is moved up and down. The gears 85, 86 naturally turn in opposite directions as the handle 24 moves and the gears engage teeth 89 on opposing sides of the toothed channel 88 as shown in FIGS. 12-13. The gears have opposing faces with knurled surfaces. Exemplary gear face 90 with knurled surface is shown in FIG. 14A and the smooth back side 91 of the gears shown in FIG. 14B. FIG. 15A shows how these gears 85, 86 oppose each other with the knurled gear faces 90 arranged for contact if brought together, whereby the locking gears 85, 86 operate somewhat like a clutch. These gears 85, 86 are spring-loaded to pull them apart, and thus, they are initially predisposed in spatially separated opposing relation in which they are not touching. This blade height lock allows for fast adjustment of the blade height, which is very useful for miter cuts and also good for repetitive cuts where the blade 5 can be set and then a person can make several similar cuts. For instance, when making channel or groove cuts it is advantageous to quickly set the height of the blade 5 so that each channel or groove has identical depth of cut by the blade.

Once the handle 24 moves the lift plate 69 to the desired height, the height may be set and retained using a height stop 92 if desired, especially for table saw use. A height stop mount plate 93 is attached to the bottom of the housing for the handle 24 as shown in FIG. 9 and includes a pair of holes 94 for receiving height adjustment screws 95 for vertical adjustment. Detached spring housing 96 is mounted above each hole 94 of the height stop mount plate 93 and each contains a spring 97 about the adjustment screws 95 for shock absorption. The spring housings 96 bear against the height stop mount plate 93 to support stop wings 98 and cushion impact when the blade 5 is lowered and the stop wings contact the top of the spring housings. The height stop mount plate 93 attaches between the transmission wall posts 77 and supports the height adjustment screws 95. The holes 94 in the height stop mount plate 93 hold the adjustment screws 95 engaged with the height stops 93 for vertical adjustment thereof. The stop wings 98 are attached to the lock plate 38 and are movable vertically toward the height stops 93. The height stops 93 comprise square nuts that move upward and downward on the adjustment screws 95 to limit the vertical movement of the stop wings 98. A dial gear 99 is arranged for operation and setting of the height stop by operating minor gears 100 that each engages the adjusting screws 95. As the dial gear 99 turns the minor gears 100, the adjustment screws 95 raise or lower the height stops 93 that are on the screws. The stop wings 98 on the adjustment screws 95 attached to the lift plate 69 provide a rest for the height stops 93 to control the height of the lift plate, thereby setting the height of the blade 5.

Several star receptacles 101A-F are arranged within the table top 2 in series on each side of the table slot 4 to receive each miter fence 19, 20 shown on the top of the table in FIG. 1. Preferably, three star receptacles 101A-F are arranged serially in longitudinal alignment with the blade 5 in the three positions shown. These star receptacles 101A-F align parallel to the table slot 4 and are spatially separated from the blade 5 by sufficient space for rotation of the miter fences 19, 20. The star receptacles 101A-F allow the miter fences to be moved and arranged to the size of the work piece by adjusting the location of each miter fence to one of the star receptacles on each side of the table slot 4. A miter fence gauge 102A-F is provided on the table top for each star receptacle 101A-F, whereby regardless of which receptacle the miter fence is placed in, the angle of the miter fence 19, 20 may be measured by the respective gauge. The miter fence gauges on the table top 2 are arranged in coordination with the rotation of the miter fences 19, 20 to determine the angle of the miter fence for miter cuts in the work piece. The coordination of each star receptacle 101A-F with a gauge 102A-F is depicted by numerals.

Figure 20:
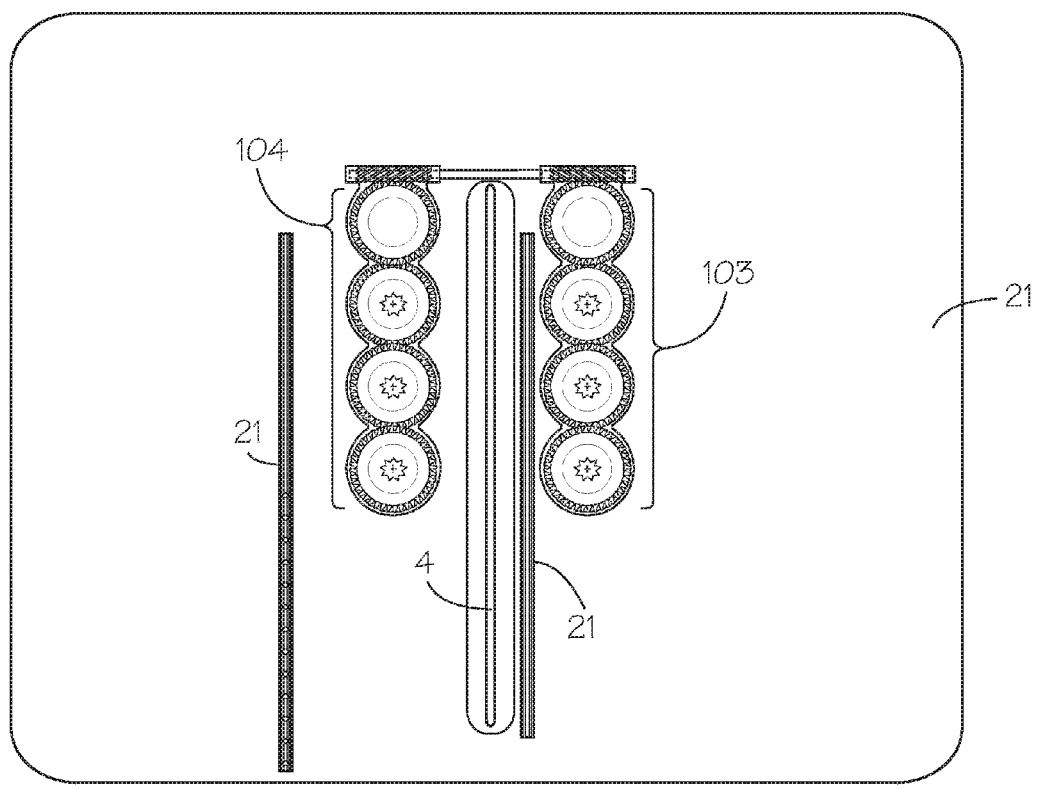
FIG. 20 is a bottom plan view of the table top and fence gear system in accordance with an embodiment of the invention.

As shown in FIGS. 16, 17, 20 each of the star receptacles 101A-Fa-f on the table top 2 are each arranged in membership with individual gears. Each of the gears is arranged symmetrical with an opposing gear of the star receptacles on the opposing side of the table slot. The gears are arranged in the bottom side of the table top and meshed together for the symmetrical operation thereof. Miter fence gears 103 are arranged below the table top for the left miter fence, and opposing miter fence gears 104 are arranged below the table top for the right miter fence. Thus, as any one of the gears turns to adjust the angle of the miter fence above the table top that is inserted into the particular star receptacle, all of the gears 103, 104 will turn in coordinated operation. Regardless of which star receptacle 101A-F miter fence 19, 20 is placed in, the gears will rotate the miter fence the same degree as the gears turn.

Figure 21:
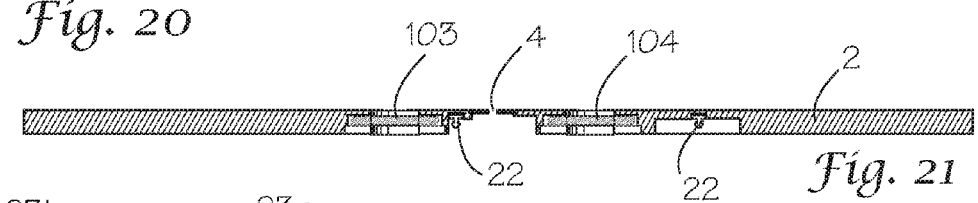
FIG. 21 is a cut-away end section view of the table top and fence gear system.
Figure 22:
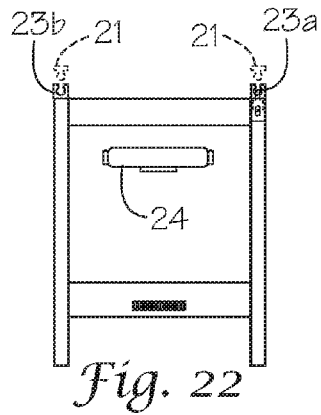
FIG. 22 is a front plan view of the handle assembly and glides arrangement in accordance with an embodiment of the invention.

The miter fences 19, 20 are preferably constructed of a non-metallic material and comprise an elongate bar as shown in FIG. 21. The miter fence 19, 20 attaches to the table top 2 by insertion of star gear 105, shown in FIG. 22, into a star receptacle 101A-F of the table top 2 in FIG. 20. The star gear 105 holds the miter fence 19, 20 on the table top 2 and prevents lateral movement. However, the miter fence 19, 20 may be further attached to the table top 2 on the opposing end of the miter fence from the star gear 105. In the embodiment shown in FIG. 21, the miter fence 19, 20 includes magnet 106 on the opposing end from the star gear 105. The magnet 106 is housed within the body of the miter fence 19, 20 and includes a lever 107 attached to the magnet for operation. The magnet 106 is engaged as shown in FIG. 24 by pushing the lever 107 upward to lower the end of the magnet. The lever 107 causes the magnet 106 to pivot about a pin 108 attached to the magnet within the housing. The lever 107 is on the opposing end of the magnet 106 from the pin 108 and provides leverage against the magnet. The lever 107 includes a wedge member 109 attached to the bottom of the lever and arranged to engage the bottom edge of the magnet 106 when the lever is pulled downward. The lever applies force to the wedge member 109 when pulled down and the wedge member inserts itself beneath the bottom edge of the magnet 106, thereby dislodging the magnet from magnetic connection with the table top 2 as shown in FIG. 25.

As shown in FIG. 21, the miter fence 19, 20 includes pin receiving holes 110 for attachment of miter fence accessories. A combination cut attachment is a useful accessory that may be added to the miter fence 19, 20 for cutting molding. FIG. 26 illustrates a combination cut accessory 111 inserted onto the left-hand miter fence. The accessory includes pins 112 that insert into the pin receiving holes 110 on the miter fence 19, 20. The combination cut accessory 111 provides a tray 113 shown in FIG. 27A and fully assembled in FIG. 27B for resting a work piece during cutting. The tray 113 may be pivotally attached to attachment member 114 by a tightening knob 115. The attachment member 114 holds the combination cut accessory on the miter fence 19, 20. The assembly of the tray 113 and attachment member 114 via the tightening knob 115 is shown in FIG. 28A. As shown, the attachment member has a pair of legs 116 that straddles the miter fence 19, 20 and overlaps the sides of the miter fence with the pins 112 inserted into the receiving holes 110, while the miter fence star gear 105 is in a star receptacle 101A-F. The tray 113 may then be adjusted to the angle desired, such as 50 degrees, in relation to the table top 2 as shown in FIG. 28B. The angle of the tray is fixed by tightening the knob 115 to secure the tray to the attachment member 114.

The tray 113 shown in FIGS. 27A-28B includes an elongate flat surface 117 for resting a work piece. The tightening knobs 115 are situated on each end of the tray for attachment of the tray to an attachment member bracket 118. The knobs 115 may include a shape and surface designed for operation by hand to install and adjust the tray 113. The knobs insert through a slot 119 on each end of the tray for the tray to slide on the knob for adjustment of the tray angle. The tray 113 may further include an elongate bottom surface 120 for resting the tray on the table top 2. The bottom surface 120 may be angled with respect to the tray 113 according to the angle that the tray will be set. The work piece rests on the tray during cutting and is supported on the tray by a short rest leg 121 that extends from the bottom edge of the tray 113 and perpendicular to the flat surface 117 of the tray.

As shown in FIG. 1 the rip fence attachment means may include a rip fence track 15, 16 for insertion of the rip fence guide 13, 14, and a rip fence rule 17 may be imprinted along the rip fence track. As illustrated in FIGS. 29-31, the rip fence 12 includes an elongate bar that moves laterally left and right on the table top 2 within the rip fence track 14 on the front edge of the table and rear edge rip fence track 16. The arrangement provides rip fence 12 parallel to the saw blade 5 for ripping an elongate work piece with the blade in fixed position. The rip fence 12 includes rip fence guides 13, 14 on each end that inserts into the tracks 15, 16 and retain the rip fence on the table top 2. On one end as shown in FIGS. 29-31, the rip fence 12 includes a lever 122 attached to the rip fence guide 13 for release of the guide from the track 15. The lever 122 includes release member 123 for disengaging the guide 13 from the track 15 as shown in FIG. 31, whereby the rip fence 12 may be lifted and removed from the table top 2.

The rotating blade 5 used by the present saw is preferably aerodynamically designed to move air away from the motor 6. As air moves away from the motor, this air flow assists in controlling and collection of dust. Further the air moves heat away from the blade and continuously helps to cool the blade during use of the blade for cutting.

A laser may be arranged beneath the table top 2 and direct a beam of laser light toward the saw blade teeth. As the blade 5 rotates, the laser light reflects off of the back side of the teeth in accordance with the rotation of the blade. The reflection appears on the work piece surface to be cut for alignment of the work piece with the blade. This helps the user to guide the work piece during cutting.

The frame 3 of the saw as shown in FIG. 1 includes a means for connecting electric power and means for controlling the power. An electrical power inlet 124 for receiving an electric plug is shown on the frame body on one side of the machine, and a flip switch 125 for turning on the saw is shown on the opposing side of the machine, as shown in FIG. 30. The flip switch 125 may be used to leave the saw blade 5 running for table saw use. The frame further supports an electric power outlet 126 for attachment of other electrically powered devices. A handle switch 127 shown in FIG. 1 may be arranged on the left and right sides of the handle 24 for operation of blade 5 during miter saw use. When preparing to cut a miter, the handle switch 127 is depressed to send power to the blade 5 concurrent with the time of beginning the cut.

I claim:

1. A saw comprising:
   a table having a table top with a table slot;
   a motor situated below the table top;
   a blade attached to the motor by a shaft;
   a tilt plate assembly attached to the motor for angular adjustment of the blade;
   a handle assembly attached to the tilt plate assembly for height adjustment of the blade within the table slot;
   the tilt plate assembly and handle assembly are attached to a carriage assembly for longitudinal movement of the blade within the table slot for cutting; and
   said motor is held by a motor assembly and said tilt plate assembly controls the position of the motor assembly to adjust the angle of the blade and maintains the blade centered within the table slot, and the tilt plate assembly travels on a square shaft during longitudinal movement of the blade, a control knob is attached to the square shaft, and the control knob adjusts the tilt plate assembly to adjust the angle of the blade.

2. The saw as in claim 1 in which a brake is operated by the control knob and includes a brake housing and a spring-loaded lock plate, and the lock plate contacts an inside surface of the brake housing to hold the blade angle in fixed position after adjustment by the control knob.

3. The saw as in claim 2 in which:
said brake housing includes a first housing member and a second housing member arranged opposite each other with opposing facing inside surfaces that enclose the lock plate and springs for spring-loading the lock plate;
the first housing member has a first inside surface and an inner housing area is provided for holding and housing the springs for spring loading the lock plate, whereby by engaging an inside face of the first housing member and an outside surface of the lock plate the springs close the brake by biasing the lock plate closed to hold the blade angle;
the inside surface of the second housing member is knurled and an inside surface of the lock plate is knurled, and these knurled surfaces contact each other when the lock plate is closed, engaging the brake and preventing turning of the control knob; and
the lock plate is released from the second housing member by a release function of the control knob, whereby on one side of the miter saw the release function is performed by pushing the control knob inward causing the lock plate to separate from the second brake housing's knurled inside fixed lock plate surface.

4. The saw as in claim 1 including shaft gears mounted on the square shaft and engaging gears on the tilt plate assembly, whereby the gears of the square shaft move the tilt plate assembly via the gears on the tilt plate assembly to control the blade angle.

5. The saw as in claim 4 in which:
the tilt plate assembly includes tilt plate units with each tilt plate unit including a kidney shaped tilt plate;
the tilt plates are supported by a pair of main plates that are welded together into the tilt plate assembly, and the main plates are structurally supported by a cross-member connecting the main plates and by connecting members;
the tilt plates provide a cooperative pair that moves with little resistance within a ribbon gear track formed within a channel in each of the main plates, and each tilt plate is held within the channel in each respective main plate;
each of the tilt plates includes a pair of meshed circular gears including an inner small circular gear of the pair that engages a toothed gear track on the upper portion of the curved upper inner circumference of a recess in the main plate, and a large circular gear of the pair of meshed gears on the tilt plate that engages the ribbon gear track situated in the channel on the lower portion of a curved inner circumference of the recess on the main plate, the ribbon gear track and the toothed gear track on the upper portion of the main plate form a pair of tilt track gears for receiving each tilt plate's pair of meshed gears; and
the tilt plates each provide a kidney gear engaged by the shaft gears via the tilt track gears.

6. The saw as in claim 5 including a shaft on a front edge of each tilt plate that connect the tilt plates to the motor assembly via a pair of structural sleeves attached to a motor housing that receive the shafts 6 of the tilt plates, and the motor assembly is movable along the shafts of the tilt plates for adjustment of the blade height within the table slot.

7. A saw comprising:
a table having a table top with a table slot;
a motor situated below the table top;
a blade attached to the motor by a shaft;
a tilt plate assembly attached to the motor for angular adjustment of the blade;
a handle assembly attached to the tilt plate assembly for height adjustment of the blade within the table slot;
the tilt plate assembly and handle assembly are attached to a carriage assembly for longitudinal movement of the blade within the table slot for cutting; and
the handle assembly includes a handle connected to an elevation lift plate for changing the blade height through vertical movement of the handle;
a housing structure attached to the handle comprising transmission walls on a left and right side of the handle and said transmission walls are supported by cross-member supports;
a bracket extends from each transmission wall and is attached to a crossbar of the handle and the crossbar acts as a pivot fulcrum for operation of the handle to lower and raise the blade height;
transmission wall gears are situated in the transmission walls and move by applying lifting and lowering force to the handle, said gears move the elevation lift plate;
the elevation lift plate includes a curved shaped channel for supporting a motor height control shaft that operates the height of the motor assembly and blade;
the transmission wall gears engage teeth on each side of the elevation lift plate and move the elevation lift plate as the handle is raised and lowered; and
posts with channels are provided on ends of the transmission walls for attachment of the elevation lift plate between these posts, and the elevation lift plate travels vertically in the post channels of the transmission walls and moves the motor height control shaft up and down.

8. A saw comprising:
a table having a table top with a table slot;
a motor situated below the table top;
a blade attached to the motor by a shaft;
a tilt plate assembly attached to the motor for angular adjustment of the blade;
a handle assembly attached to the tilt plate assembly for height adjustment of the blade within the table slot;
the tilt plate assembly and handle assembly are attached to a carriage assembly for longitudinal movement of the blade within the table slot for cutting; and
said handle assembly includes a handle and the handle is used to lock the blade height using a blade height lock having two gears forming a locking gear set, said handle is attached to a pull plate shaft and the pull plate shaft is attached to a pull plate, whereby the handle turns the pull plate shaft to move the pull plate and pull the two gears of the locking gear set together to lock the vertical movement of the handle.

9. The saw as in claim 7 in which:
said handle assembly includes a handle and a handle housing, and height stops;
the height stops are attached to a height stop mount plate that is attached to a bottom of the handle housing;
the height stop mount plate includes a pair of holes for receiving height adjustment screws;
a detached spring housing is mounted above each hole of the height stop mount plate and each contains a spring about the adjustment screws, and the spring housings bear against the height stop mount plate and support stop wings;
the height stop mount plate attaches between the posts on the ends of the transmission walls;

the holes in the height stop mount plate hold the height adjustment screws engaged with the height stops for vertical adjustment thereof;

the stop wings are attached to a lock plate and are movable vertically toward the height stops, which limit the movement of the stop wings; and a dial gear is arranged for operation and setting of the height stops by operating minor gears that each engages the adjustment screws to raise or lower the height stops, whereby the stop wings provide a rest for the height stops to control the height of the elevation lift plate, thereby setting the height of the blade.

10. A saw comprising:

a table having a table top with a table slot;

a motor situated below the table top;

a blade attached to the motor by a shaft;

a tilt plate assembly attached to the motor for angular adjustment of the blade;

a handle assembly attached to the tilt plate assembly for height adjustment of the blade within the table slot;

the tilt plate assembly and handle assembly are attached to a carriage assembly for longitudinal movement of the blade within the table slot for cutting; and at least one receptacle arranged within the table top on opposing sides of the table slot providing at least one pair of opposing receptacles in which each receptacle of a pair is spatially separated equal distance from the table slot;

the at least one receptacle on each side of the table slot is arranged serially with additional receptacles on the particular side and arranged in longitudinal alignment with the blade and parallel to the table slot;

a pair of miter fences with a gear attached to each are provided;

a receptacle of the at least one receptacle on each side each receives the gear of an opposing miter fence of the pair of miter fences;

the receptacles operate symmetrically in membership with receptacle gears to rotate each miter fence the same degree during adjustment of the angle of each miter fence; and the pair of miter fences on the table are interconnected by the receptacle gears for complementary angular adjustment.

11. The saw as in claim 6 in which said tilt plates each include a toothed edge for receiving gears for lifting the motor assembly.

12. The saw as in claim 7 in which said handle assembly connects to the left and right glide members by the attachment of a top portion of each of the transmission walls or a top portion of each of the posts to each of the respective glide members for sliding engagement of the handle assembly on a bottom of the table top.

* * * * *